US006520157B2

(12) United States Patent
Boecking

(10) Patent No.: US 6,520,157 B2
(45) Date of Patent: Feb. 18, 2003

(54) HIGH-PRESSURE INJECTOR WITH REDUCED LEAKAGE

(75) Inventor: Friedrich Boecking, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/893,592

(22) Filed: Jun. 29, 2001

(65) Prior Publication Data

US 2002/0060253 A1 May 23, 2002

(30) Foreign Application Priority Data

Jun. 29, 2000 (DE) ........................................ 100 31 570

(51) Int. Cl.[7] .......................... F02M 37/04; F16K 31/42

(52) U.S. Cl. .................. 123/458; 123/198 D; 137/628; 251/30.05

(58) Field of Search ................................ 123/458, 457, 123/467, 198 D; 137/628; 251/30.02, 30.05; 239/88–96

(56) References Cited

U.S. PATENT DOCUMENTS 4,479,475 A * 10/1984 Babitzka ..................... 123/446
4,530,329 A * 7/1985 Maisch et al. .............. 123/447
4,763,873 A * 8/1988 Phillips ................... 251/30.05
4,997,133 A * 3/1991 Ausiello et al. ......... 239/585.2
5,020,771 A * 6/1991 Nakatsukasa et al. .... 251/30.02
5,125,807 A * 6/1992 Kohler et al. ............... 417/490
5,606,953 A * 3/1997 Drummer et al. ........... 123/506
5,662,083 A * 9/1997 Patyi ..................... 123/339.27
5,941,215 A * 8/1999 Augustin .................... 123/467
6,386,185 B1 * 5/2002 Cooke ........................ 123/506
6,422,211 B1 * 7/2002 Boecking .................... 123/501

* cited by examiner

*Primary Examiner*—Carl S. Miller
(74) *Attorney, Agent, or Firm*—Ronald E. Greigg

(57) ABSTRACT

The invention relates to an injector for an injection system for injecting highly pressurized fuel into the combustion chambers of internal combustion engines. An inlet from the high-pressure accumulation chamber feeds into a control chamber that can be connected to the nozzle inlet of the injection nozzle by means of a sealing seat that can be opened. In order to close the leakage oil outlet when the inlet line from the high-pressure accumulation chamber is opened, a sealing surface covers outlet-side control edges on the valve housing.

9 Claims, 3 Drawing Sheets

HIGH-PRESSURE INJECTOR WITH REDUCED LEAKAGE

BACKGROUND OF THE INVENTION

1. Field of the Invention

Injection systems that are connected to a high-pressure accumulation chamber use pressure-controlled injectors whose control elements can be actuated electromagnetically. In such injection systems for fuel under extremely high pressure, if an overlap occurs between the open high-pressure region and the outlet-side leakage oil bore, this results in a considerable decrease in efficiency of injection systems embodied in this manner. Therefore, short circuits between the open high-pressure side inlet from the high-pressure accumulation chamber and outlet-side leakage oil bores should absolutely be prevented.

2. Description of the Prior Art

DE 198 35 494 A1 relates to a unit injector system which serves to supply fuel to the combustion chamber of directly injected internal combustion engines having a pump unit for building up an injection pressure and for injecting the fuel into the combustion chamber by way of an injection nozzle. The control unit contains a control part that is embodied as a valve that opens outward. Furthermore, a valve actuation device is provided for regulating the pressure build-up in the pump unit.

In order to create a unit injector system that is embodied in a simple design and has smaller outer dimensions, the valve actuation device is embodied as a piezoelectric actuator. In particular, this measure allows for extremely short response times.

Leakage losses that occur in injection systems significantly reduce the injection pressures that can be achieved and thus considerably reduce the efficiency of such systems.

OBJECT AND SUMMARY OF THE INVENTION

The advantages that can be achieved with the embodiment according to the invention has the chief advantage over the prior art that a leakage of highly-pressurized fuel can now be effectively prevented through discharging it into outlet-side discharge bores in the injector body during the opening phase of the seat valve. The efficiency of an injection system that is provided with the injector embodied according to the invention can thus be significantly increased. In the embodiment proposed according to the invention, an overlap phase between the open inlet line from the high-pressure accumulation chamber (common rail) and the open leakage oil outlet does in fact occur, but the highly pressurized fuel coming into the valve control chamber is prevented from being discharged directly into the outlet-side discharge bores by virtue of the fact that suitable sealing surfaces are provided.

According to one embodiment of the concept underlying the invention, the total lift path of the control part can be extended and a slide valve with a short lift length can be disposed preceding the seat valve on the high-pressure side. The total lift of the control part is extended by this short lift length. When the seat valve is closed, a longer lift length assures that an overlap will occur on the seat face of the valve. The above-mentioned short lift length increases the lift length of the seat valve $h_{tot}$ so that, when it is opened, no bypass occurs from the high-pressure inlet to the outlet-side leakage oil bores. The control edges on the sealing surface and the valve housing assure that the outlet-side leakage oil bores are always sealed as soon as the inlet opens the inlet lines from the high-pressure accumulation chamber.

In an alternative embodiment of the concept underlying the invention, a supplementary piston can be movably disposed on the control part. When the control part is actuated, the supplementary piston executes a movement oriented counter to its actuation direction which, by means of the fuel coming into the valve chamber under extremely high pressure, is effected so that a control edge of the supplementary piston closes against a control edge on the valve housing on the discharge side.

By means of slight changes to the control part, which is actuated electromagnetically or by a piezoelectric actuator, which require very little labor from a production technology standpoint, it is possible to achieve a substantial improvement of the efficiency of an injection system, in particular a substantially more precise metering of the fuel quantity to be injected during the pre-injection phase in the combustion chamber of an internal combustion engine.

BRIEF DESCRIPTION OF THE DRAWINGS

The invention will be better understood and further objects and advantages thereof will become more apparent from the ensuing detailed description of preferred embodiments taken in conjunction with the drawings, which.

DESCRIPTION OF THE PREFERRED EMBODIMENTS

Figure 1A:
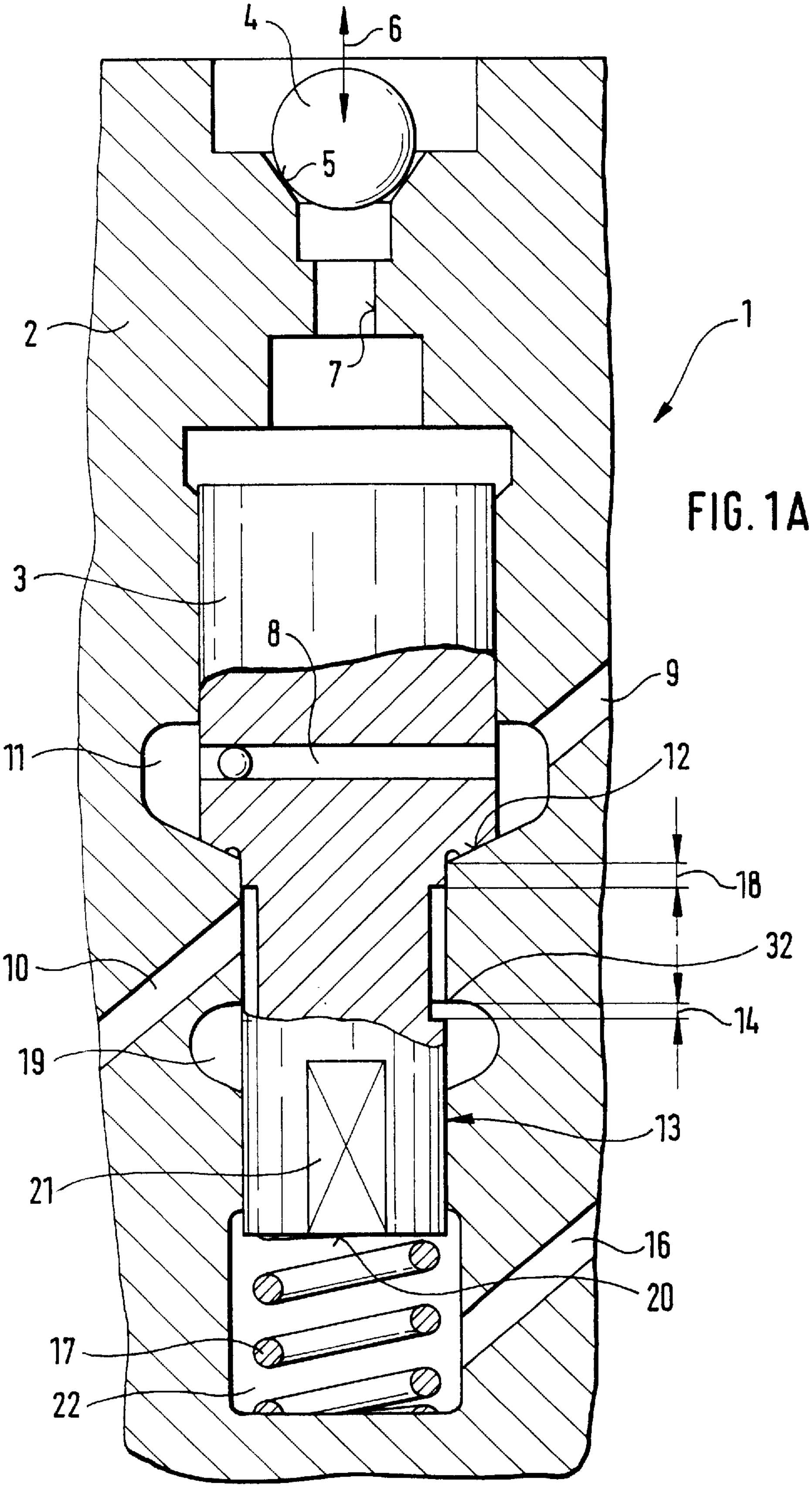
FIG. 1A shows the injector with the overlapping lengths of the individual components noted.
Figure 1B:
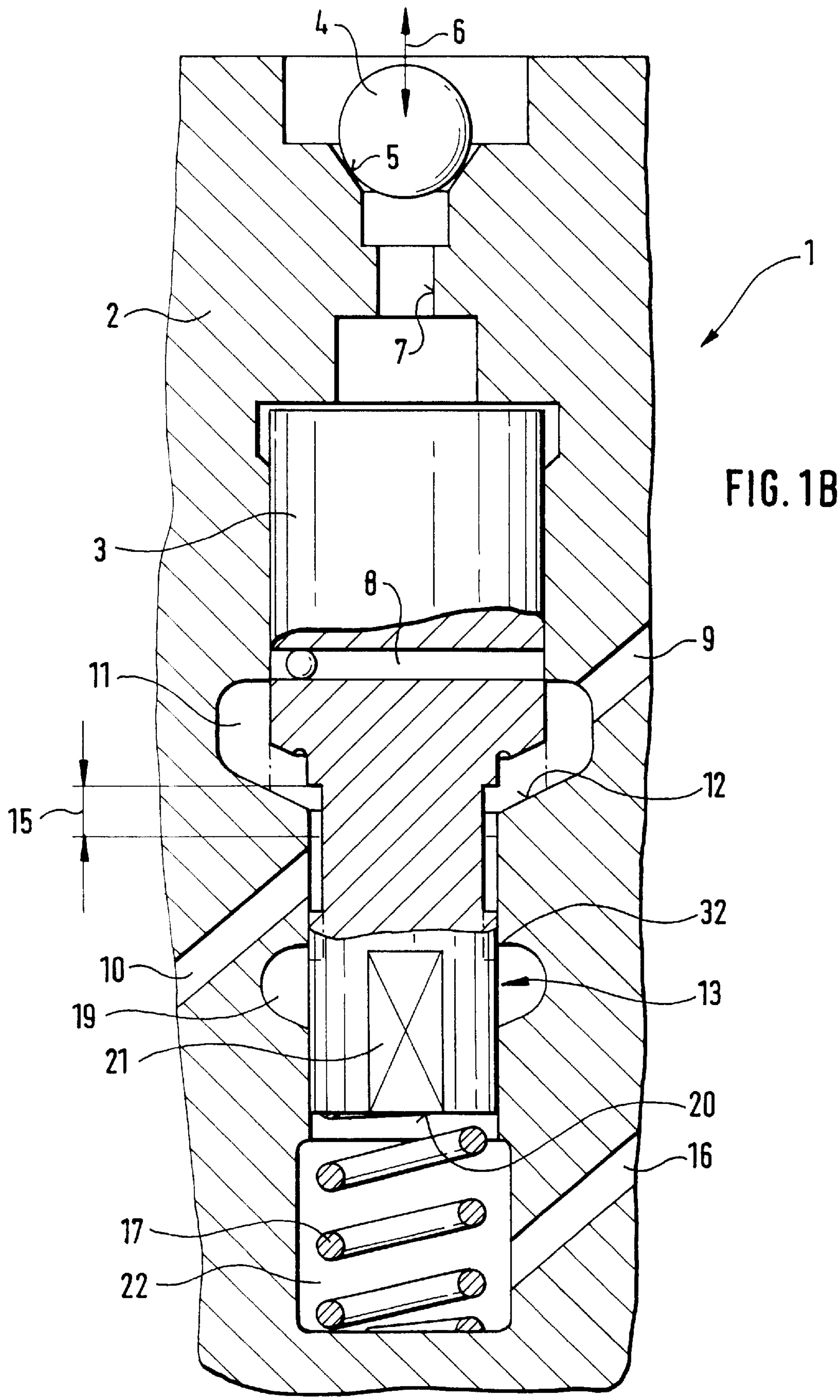
FIG. 1B shows the injector again, with the total lift path that occurs in the vertical direction.

FIG. 1A shows the control part 3 of the injector 1 with the overlapping lengths 18 between the valve chamber 11 and the nozzle inlet 10 noted; FIG. 1B shows the injector 1 according to FIG. 1A in its raised state, in which the control part 3 has been moved upward by the lift path 15.

The control part 3 of the injector 1 for a system that injects fuel under extremely high pressure is contained in a valve housing 2. A control valve provided on the outlet side, in this case in the form of a sealing ball, is contained in the upper part of the injector 1. An electromagnet and/or a piezoelectric actuator, which is not shown in detail here, is accommodated above the ball that functions as an outlet-side control valve 4. Through actuation of this actuator, the ball serving as the outlet-side control valve 4 can be relieved of pressure, as a result of which the outlet-side control valve opens at its sealing seat 5. The ball-shaped element moves upward in the direction of the double arrow labeled with the reference numeral 6 and unblocks an outlet throttle 7 on the outlet side. This decreases the pressure in the control chamber ending above the end face of the control part 3. By means of the compression spring 17 disposed on the lower end of the control part 3, the control part 3 moves upward as a unit.

An inlet throttle 8 is embodied in the control part 3 of the injector 1 according to FIG. 1 and passes through the control part 3 in the crosswise direction. This throttle can, for example, be embodied as a simple through bore in the middle section of the control part 3. In the vicinity of the inlet throttle 8, the control part is closed in by a control chamber 11 that encompasses it in the shape of a ring. The bore on the inlet side, identified with the reference numeral 9, feeds into the control chamber 11, which is embodied in the valve housing 2 and has rounded edges that promote flow; the highly pressurized fuel travels through this bore from the high-pressure accumulation chamber (common rail) into the control chamber 11 of the injector 1.

At its seat 12, the control part 3 of the injector seals the inlet 10 to the injection nozzle. Below the annular pressure chamber, into which the inlet line 10 to the injection nozzle feeds, a sealing surface 13 is embodied on the control part 3 of the injector 1 and has an outer diameter identical to that of the bore in the valve housing 2. Below the mouth of the inlet bore 10 to the injection nozzle, there is a control chamber 19 on which a control edge 32 is embodied. In the vertical position of the control part 3 in relation to the valve housing 2 shown in FIGS. 1A and 1B, the control edge 32 in the valve housing 2 is closed in a straight manner by means of the sealing surface 13, by means of the short length 14 ($h_1$) of this sealing surface. In the lower region of the control part 3, which is embodied in an essentially rotationally symmetrical manner, two surfaces 21 disposed across from each other are embodied, by way of which leakage oil leaking from the control chamber 19 can flow out into the hollow chamber 22 disposed at the lower end face of the control part 3. A compression spring element 17 is contained in this hollow chamber 22 and causes a displacement motion of the control part 3 in the vertical direction when the pressure of the control chamber in the upper region of the injector is relieved. The spring element 17 is supported on the base of the valve housing 2 of the injector 1 and rests against an end face of the control part 3 with its upper coil. A further leakage oil outlet 16 feeds into the hollow chamber 22 on the underside of the control part 3.

If the control chamber above the upper end face of the control part 3 is relieved of pressure, which occurs by means of an opening of the valve seat 5 due to pressure relief of the ball-shaped, outlet-side control part 4, the control part 3 moves upward, actuated by the compression spring 17 resting against its end face 20. As a result, the inlet throttle 8 passing through the control part 3 travels into the valve housing 2 and is thereby closed. At the same time, the fuel, which is under high pressure by way of the high-pressure accumulation chamber, is present in the control chamber 11 by way of the inlet line 9. By means of the vertical upward motion of the control part 3, it is moved upward over the total lift length 15 $h_{tot}$ and thus unblocks a direct connection between the inlet line 9 from the high-pressure accumulation chamber (common rail) to the inlet line 10 of the injection nozzle by way of the annular chamber embodied on the control part 3. At the same time, as the vertical motion of the control part 3 is a length 14 $h_1$, its sealing surface 13 has just covered the control edge 32 embodied on the side of the valve housing so that the control chamber 19 is sealed off from the highly pressurized fuel in the supply line 10 to the injection nozzle. Leakage oil quantities discharging from the control chamber 19 into the hollow chamber 22 by way of the surfaces 21 flow into a leakage oil discharge 16 by way of the hollow chamber 22.

In a second preferred embodiment of the concept underlying the invention, a relatively movable supplementary piston 24 is accommodated on the control part 3. The control part 3 has a geometry essentially corresponding to the configuration of the control part 3 according to FIG. 1 and has an inlet throttle 8 in its upper section, which passes diagonally through the control part body 3. A control chamber that is embodied in the valve housing 2 is disposed above the inlet throttle 8.

An outlet throttle 7 is connected to the control chamber and can be opened or closed by means of a control part 4 on the outlet side. For this purpose, an electromagnet or a piezoelectric actuator or even another actuation unit is provided, which causes an actuation of the outlet-side control part 4 in the vertical direction 6 toward the valve seating 5 or away from it.

Below the inlet throttle 8 running diagonally in the control part 3, a constriction is embodied on the control part 3, which forms the sealing seat 25.

Below the constriction point in the control part 3, a supplementary piston 24 is accommodated on its circumference so that it can be moved in the axial direction; this support piston 24 is supported by a compression spring element 17, which is in turn supported on the base of the valve housing 2. Analogously to the embodiment of the control part according to FIG. 1, surfaces 21 are embodied on the control part 3, by way of which leakage oil that has seeped into the hollow chamber containing the compression spring 17 can drain into the hollow chamber 22 on the outlet side.

The supplementary piston 24 is movably supported on the control part 3 by means of an internal guide 27 and in its upper region, has a groove 26 extending in the axial direction of the control part 3 and of the supplementary piston 24.

An actuation of the outlet-side control valve 4 and an associated reduction in pressure in the control chamber of the valve housing 2, into which the upper end face of the control part 3 protrudes, causes a vertical movement of the control part 3, actuated by the compression spring 17, in the direction of the outlet throttle 7. In this manner, the sealing seat 25 between the control part 3 and the valve housing 2 is opened and fuel that is under extremely high pressure can travel into the control chamber 11 from the high-pressure accumulation chamber (common rail) by way of the inlet line 9. The highly-pressurized fuel causes a downward movement in the force direction of the supplementary piston 24, counter to the movements of the control part 3 that are oriented vertically upward and counter to the spring element 17 that prestresses this support piston. This downward-oriented vertical motion causes a displacement of the supplementary piston 24 over a displacement path 31. In this manner, on the one hand, the inlet from the high-pressure accumulation chamber 9 is connected to the open sealing seat 25 by way of the control chamber 11 and the pressure chamber 28 is connected to the nozzle inlet 10 and, on the other hand, the downward-oriented vertical motion over the axial length 31 causes the leakage oil control edge 32 embodied on the valve housing 2 to be closed by the lower region of the supplementary piston 24. The dimensions of the displacement paths 31 and 30 are proportioned in such a way that, when the nozzle inlet 170 is unblocked, the supplementary piston 24 is a assured of having effectively covered the leakage oil-side control edge 32 in the valve housing 2 by means of its lower annular region through compression of the spring element 17 in the injector in the valve housing 2. It is desirable for the vertical lift path 31 to be greater than the lift path 30 necessary for sealing the control edge 32 on the valve housing 2 through appropriate dimensioning of the supplementary piston 24.

In the reverse case, when closing the sealing surface 25 between the control part 3 of the injector and the valve housing 2 of the injector 1, a pressure build-up occurs in the control chamber on the upper end face of the control part 3, causing the upper region of the control part 3 embodied with a diameter d, to move into its sealing position 25. The supplementary piston 24 on the control part 3 is loaded by the spring element 17 and moves in the direction of the sealing surface 25. In order to reduce the pressure at the constriction point of the control part 3 and valve housing 2, a longitudinal groove is embodied in the upper region of the supplementary piston 24 and allows the supplementary piston 24 to be closed; this groove permits the pressure during closing of the control part in the direction of its sealing seat 25 to be released into the pressure chamber 28. The relief groove 26 embodied in the upper guide region of the supplementary piston 24 permits the achievement of a more rapid closing induced by the compression spring 17. Leakage occurring in the pressure chamber 28 can flow out by way of the surfaces 21 embodied on the control part 3 into a hollow chamber 22 provided below the lower end face of the control part 3.

Figure 2:
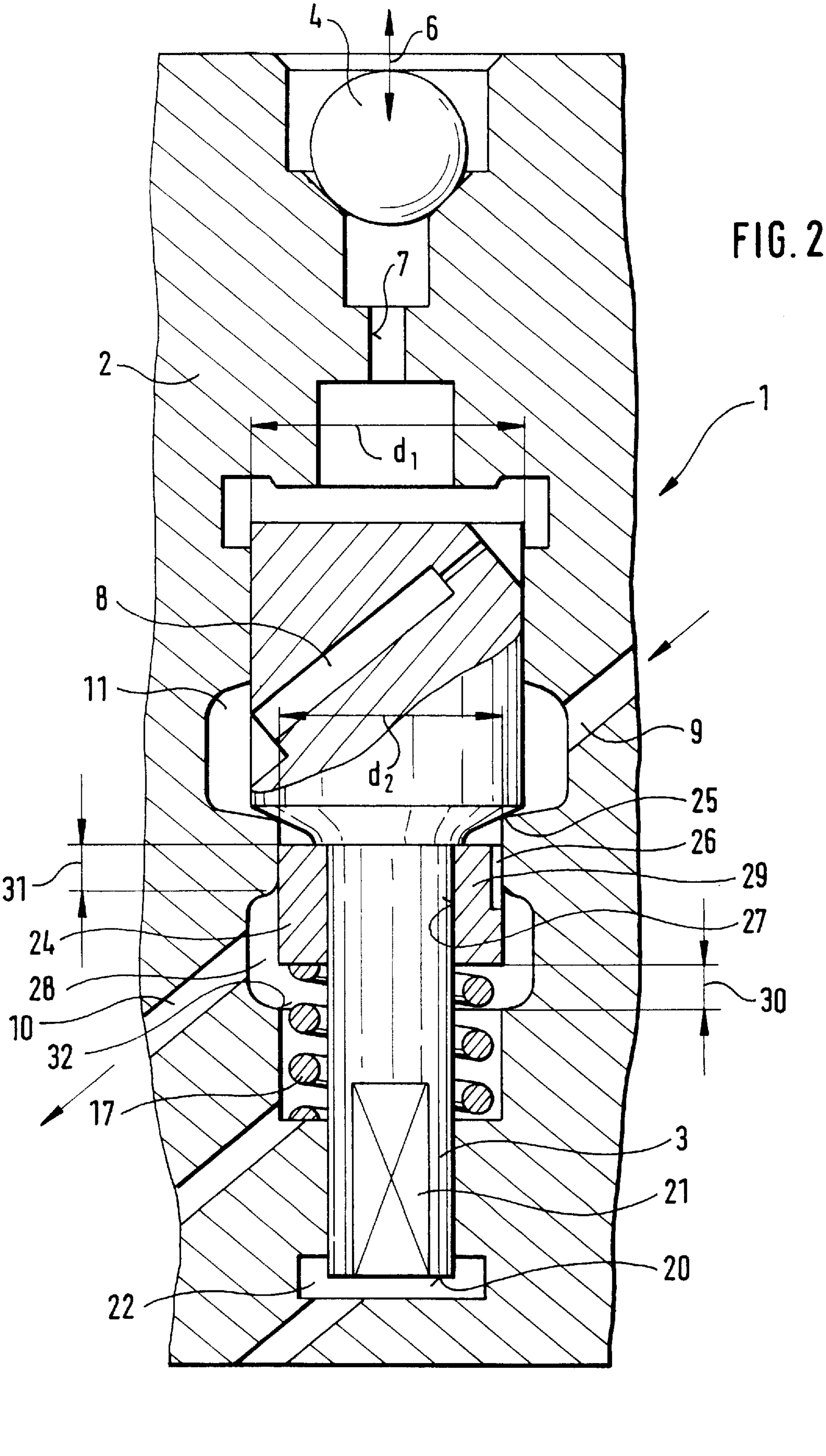
FIG. 2 shows a high-pressure injector with a supplementary piston, which is accommodated on the control part, has an overflow groove, and is loaded by a compression spring.

In order to actuate the preferred embodiments according to FIG. 1 and FIG. 2, electromagnets, piezoelectric actuators, or even mechanical/hydraulic pressure transmitters can be used, which produce a vertical movement in the direction of the respective double arrow indicated in FIGS. 1 and 2, whereby the control part 3 of the injector 1 in the valve housing 2 can be moved either into its position that opens or closes the respective sealing seat. The separation of a direct connection between the high-pressure inlet 9 and the outlet-side discharge bores attained with the sealing surface configuration according to the invention allows a significant increase of the efficiency of an injector produced in such a manner.

The foregoing relates to preferred exemplary embodiments of the invention, it being understood that other variants and embodiments thereof are possible within the spirit and scope of the invention, the latter being defined by the appended claims.

I claim:

1. In an injector for an injection system for injecting highly pressurized fuel into the combustion chamber of internal combustion engines, in which a supply line (9) from the high-pressure accumulation chamber feeds into a control chamber (11) that can be connected to a nozzle inlet (10) to the injection nozzle by means of a sealing seat (12, 25) that can be opened and closed, the improvement wherein, for the purpose of sealing off leakage oil outlets (16) when the supply line (9) from the high-pressure accumulation chamber is opened, a sealing surface (13) of a control part overlaps an outlet side control edge (32) on the valve housing (2).

2. The injector according to claim 1, wherein said sealing surface is embodied on a supplementary piston that encompasses part of the control part (3).

3. The injector according to claim 2, wherein said the supplementary piston (24) can be moved in relation to the control part (3) in a spring-loaded manner.

4. The injector according to claim 2, wherein when the sealing seat (12, 25) of the control part (3) is opened, the supplementary piston (24) overlaps a control edge (32) on the valve housing (2) with its lower guide region by an overlap length $h_2$.

5. The injector according to claim 2, wherein a relief groove (26) which encourages the closing motion of the compression spring (17) is provided in the upper guide region (29) of the supplementary piston (24).

6. The injector according to claim 2, wherein said supplementary piston (24) of the control part (3) executes a lifting motion (31) which is oriented counter to the opening motion of the control part (3) and unblocks the inlet bore (10) to the injection nozzle.

7. The injector according to claim 1, wherein said sealing surface (13) on the control part (3) has an extension $h_1$ that overlaps the control edge (32) in the open position of the control part (3).

8. The injector according to claim 7, wherein the total lift path $h_{tot}$ of the control part (3) is dimensioned so that when there is a connection (15) between the inlet line (9) from the high-pressure accumulation chamber and the inlet bore (10) of the injection nozzle, an inlet throttle (8) passing through the control part (3) on the outlet side is sealed.

9. The injector according to claim 7, wherein when the control part (3) is actuated in the lift direction (6) during the relief of a control chamber, the sealing surface (13) seals off a valve chamber (19) provided on the outlet side in the valve housing (2) by covering the control edge (32) on the valve housing (2).

* * * * *